United States Patent
Cho et al.

(10) Patent No.: US 10,067,376 B2
(45) Date of Patent: Sep. 4, 2018

(54) REFLECTIVE DISPLAY DEVICE

(71) Applicant: Samsung Display Co., Ltd., Yongin-si (KR)

(72) Inventors: Seon Ah Cho, Gwangmyeong-si (KR); Young Jin Park, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/651,457

(22) Filed: Jul. 17, 2017

(65) Prior Publication Data

US 2018/0101060 A1  Apr. 12, 2018

(30) Foreign Application Priority Data

Oct. 12, 2016  (KR) .................. 10-2016-0132209

(51) Int. Cl.
G02F 1/1335  (2006.01)
G02F 1/1337  (2006.01)
G02F 1/13363  (2006.01)
G02F 1/137  (2006.01)

(52) U.S. Cl.
CPC ........ *G02F 1/133536* (2013.01); *G02F 1/137* (2013.01); *G02F 1/1337* (2013.01); *G02F 1/13362* (2013.01); *G02F 1/13363* (2013.01); *G02F 1/133504* (2013.01); *G02F 1/133528* (2013.01); *G02F 1/133553* (2013.01); *G02F 2001/133531* (2013.01); *G02F 2001/133548* (2013.01); *G02F 2001/133614* (2013.01); *G02F 2001/133618* (2013.01); *G02F 2001/133742* (2013.01); *G02F 2203/02* (2013.01); *G02F 2203/19* (2013.01); *G02F 2413/02* (2013.01); *G02F 2413/06* (2013.01)

(58) Field of Classification Search
CPC ......... G02F 1/133553; G02F 1/133536; G02F 2001/133557
See application file for complete search history.

(56) References Cited

U.S. PATENT DOCUMENTS

| 9,616,816 B2 * | 4/2017 | Takada .................... B60R 1/084 |
| 2004/0051827 A1 * | 3/2004 | Hinata .............. G02F 1/133528 349/113 |
| 2006/0103782 A1 | 5/2006 | Adachi et al. |
| 2016/0221508 A1 * | 8/2016 | Takada .................... B60R 1/084 |

FOREIGN PATENT DOCUMENTS

| JP | 2006-139160 | 6/2006 |
| KR | 10-2011-076435 A | 7/2011 |
| KR | 10-2015-0069368 A | 6/2015 |

* cited by examiner

*Primary Examiner* — Phu Vu
(74) *Attorney, Agent, or Firm* — H.C. Park & Associates, PLC

(57) ABSTRACT

A reflective display device including: a reflection plate; a liquid crystal layer disposed on the reflection plate, the liquid crystal layer including a liquid crystal aligned vertically in an initial alignment state, a first phase delay layer disposed on the liquid crystal layer; a reflective polarizing element disposed on the first phase delay layer; and an absorptive polarizing element disposed on the reflective polarizing element, wherein external light incident on the absorptive polarizing element is in an unpolarized state.

20 Claims, 12 Drawing Sheets

REFLECTIVE DISPLAY DEVICE

CROSS-REFERENCE TO RELATED APPLICATION

This application claims priority from and the benefit of Korean Patent Application No. 10-2016-0132209 filed on Oct. 12, 2016, which is hereby incorporated by reference for all purposes as if fully set forth herein.

BACKGROUND

Field

Exemplary embodiments relate to a reflective display device.

Discussion of the Background

A liquid crystal display device is one of the most widely used display devices at present. In general, a liquid crystal display device includes a display panel including a liquid crystal layer, two polarizing plates provided on the upper and lower sides thereof, and an internal light source. The two polarizing plates serve as a shutter for adjusting the amount of light provided from a light source in cooperation with the liquid crystal layer, thereby realizing image display.

However, the amount of light that is transmitted through the display panel and contributes to image display is only about 20% of the amount of light emitted from the light source, and the remaining 80% of light is lost, so that the utilization efficiency of light is not high. Further, most of the power required for driving the liquid crystal display device is consumed in emitting light from the light source.

Accordingly, there is a demand for development of a technique for reducing the amount of power consumed by a light source without deteriorating display quality.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a reflective display device having a new structure capable of reducing power consumed by a light source by using external light as a light source contributing to image display.

Exemplary embodiments also provide a reflective display device with improved display quality by further improving the utilization efficiency of external light.

Additional aspects will be set forth in the detailed description which follows, and, in part, will be apparent from the disclosure, or may be learned by practice of the inventive concepts.

According to exemplary embodiments, there is provided a reflective display device. The reflective display device comprising: a reflection plate; a liquid crystal layer disposed on the reflection plate, the liquid crystal layer including a liquid crystal aligned vertically in an initial alignment state, a first phase delay layer disposed on the liquid crystal layer; a reflective polarizing element disposed on the first phase delay layer; and an absorptive polarizing element disposed on the reflective polarizing element, wherein external light incident on the absorptive polarizing element is in an unpolarized state.

In an exemplary embodiment, the reflection plate may specularly reflect at least a part of light transmitted through the liquid crystal layer and incident on the reflection plate, and may diffusely reflect at least a part of light transmitted through the liquid crystal layer and incident on the reflection plate.

In an exemplary embodiment, one surface of the reflection plate facing the liquid crystal layer may include an uneven surface.

In an exemplary embodiment, the reflection plate may include an opaque metal.

In an exemplary embodiment, a transmission axis of the reflective polarizing element may be parallel to a transmission axis of the absorptive polarizing element.

In an exemplary embodiment, in a state where an electric field is applied to the liquid crystal layer, a $\Delta$nd value of the liquid crystal layer may be $(2k+1)\lambda/4$ (where k is an integer equal to or greater than 0).

In an exemplary embodiment, in a state where an electric field is not applied to the liquid crystal layer, a polarization state of light transmitted through the liquid crystal layer and traveling toward the reflection plate may have a phase delayed by $(2k+1)\lambda/4$ (where k is an integer equal to or greater than 0) as compared with a polarization state of light transmitted through the absorptive polarizing element and traveling toward the reflective polarizing element.

In an exemplary embodiment, a phase delay value of the first phase delay layer may be $(2k+1)\lambda/4$ (where k is an integer equal to or greater than 0).

In an exemplary embodiment, the reflective display device may further comprise a second phase delay layer disposed between the liquid crystal layer and the reflective polarizing element, wherein a phase delay value of the second phase delay layer may be $(k+1)\lambda/2$ (where k is an integer equal to or greater than 0).

In an exemplary embodiment, in a state where an electric field is not applied to the liquid crystal layer, a polarization state of light transmitted through the liquid crystal layer and traveling toward the reflection plate may have a phase delayed by $(2k+3)\lambda/4$ (where k is an integer equal to or greater than 0) as compared with a polarization state of light transmitted through the absorptive polarizing element and traveling toward the reflective polarizing element.

In an exemplary embodiment, the reflective display device may further comprise a color conversion layer disposed between the liquid crystal layer and the first phase delay layer.

In an exemplary embodiment, the reflective polarizing element may include a first refraction layer and a second refraction layer having a refractive index different from that of the first refraction layer, and wherein the first refraction layer and the second refraction layer may be stacked alternately.

According to an exemplary embodiment of the invention, there is provided a reflective display device comprising: a reflection plate; a liquid crystal layer disposed on the reflection plate, the liquid crystal layer including a twisted nematic liquid crystal, a reflective polarizing element disposed on the liquid crystal layer; and an absorptive polarizing element disposed on the reflective polarizing element, wherein external light incident on the absorptive polarizing element is in an unpolarized state.

In an exemplary embodiment, the reflection plate may specularly reflect at least a part of light transmitted through the liquid crystal layer and incident on the reflection plate, and may diffusely reflect at least a part of light transmitted through the liquid crystal layer and incident on the reflection plate.

In an exemplary embodiment, a transmission axis of the reflective polarizing element may be parallel to a transmission axis of the absorptive polarizing element.

In an exemplary embodiment, the reflective display device may further comprise a first alignment layer disposed between the reflection plate and the liquid crystal layer; and a second alignment layer disposed between the liquid crystal layer and the reflective polarizing element, wherein in a state where an electric field is not applied to the liquid crystal layer, a major axis direction of the liquid crystal adjacent to the second alignment layer may be parallel to a transmission axis direction of the reflective polarizing element.

In an exemplary embodiment, in a state where an electric field is not applied to the liquid crystal layer, a major axis direction of the liquid crystal adjacent to the first alignment layer may intersect the transmission axis direction of the reflective polarizing element.

In an exemplary embodiment, in a state where an electric field is not applied to the liquid crystal layer, a Δnd value of the liquid crystal layer may be $(2k+1)\lambda/4$ (where k is an integer equal to or greater than 0).

In an exemplary embodiment, in a state where an electric field is not applied to the liquid crystal layer, a polarization state of light transmitted through the liquid crystal layer and traveling toward the reflection plate may have a phase delayed by $(2k+1)\lambda/4$ (where k is an integer equal to or greater than 0) as compared with a polarization state of light transmitted through the absorptive polarizing element and traveling toward the reflective polarizing element.

In an exemplary embodiment, the reflective polarizing element may include a wire grid pattern.

According to the reflective display device according to an embodiment of the present disclosure, an image display function can be implemented without a separate internal light source, thereby reducing the power consumption. In particular, it can have excellent display quality outdoors.

In addition, by omitting an internal light source, the display device can be made thin. Further, at least a part of light reflected by the reflection plate is reflected again by the reflective polarizing element and used for image display, thereby maximizing the utilization efficiency of light.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
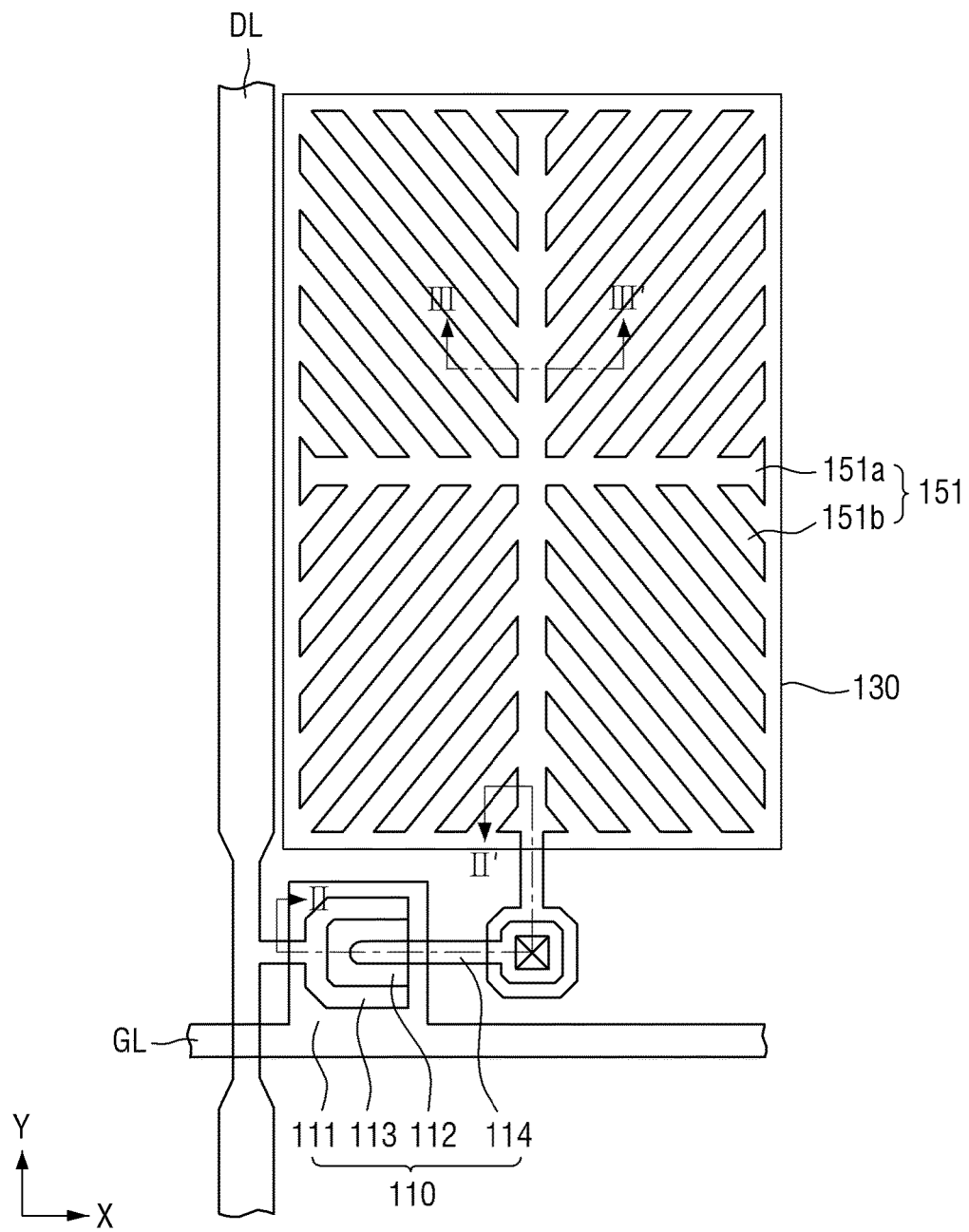
FIG. 1 shows a layout of one pixel region of a first display substrate included in a reflective display device according to an embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

In the present specification, a reflective display device refers to a display device in which external light, such as natural light or external illumination, serving as a light source, substantially contributes to image display. Further, the reflective display device includes not only a display device using only an external light source as a light source, but also a display device at least partially using an internal light source in addition to an external light source, or a transflective (semi-transmissive semi-reflective) display device having a mode using an internal light source and a mode using an external light source.

Hereinafter, exemplary embodiments of the present disclosure will be described with reference to the accompanying drawings.

Figure 2:
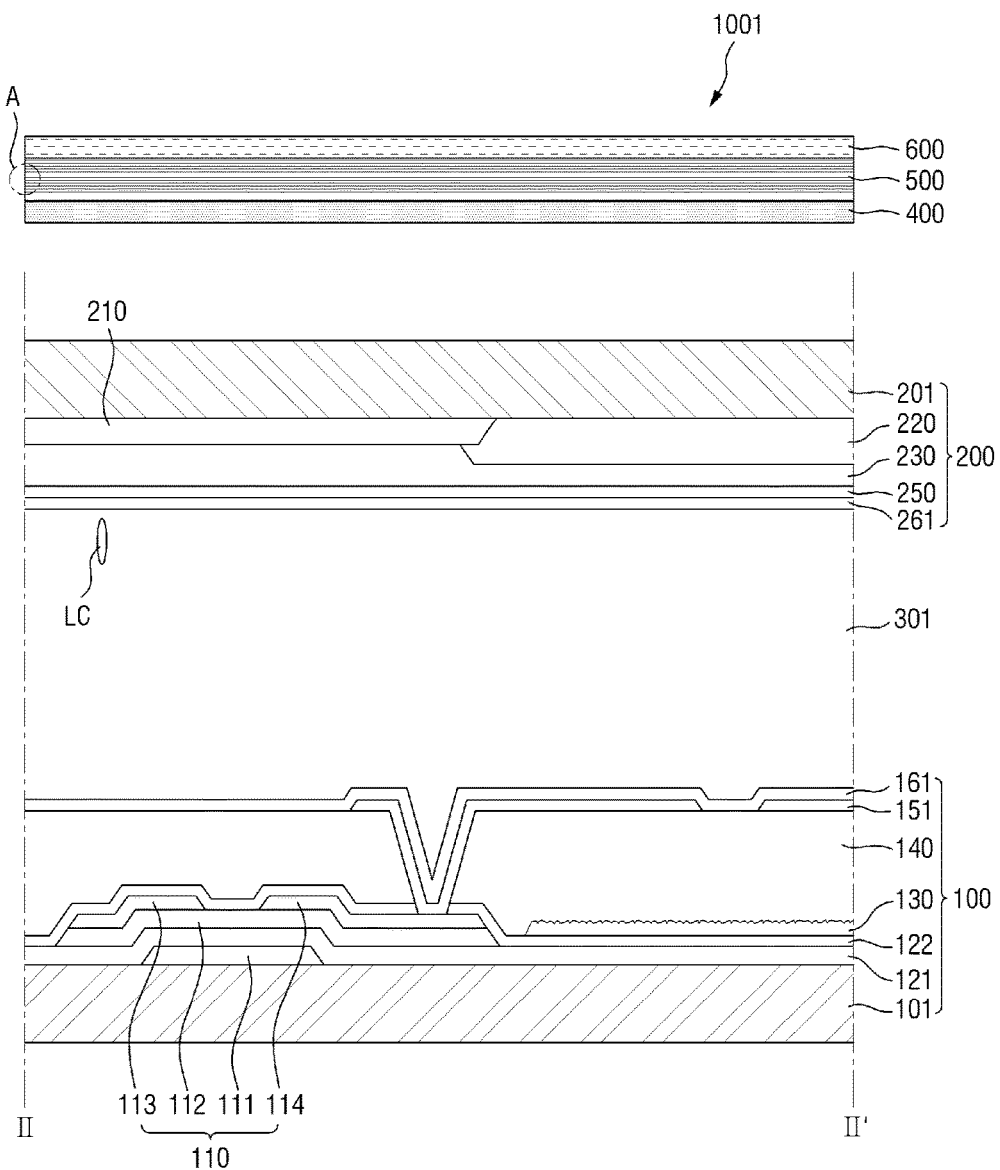
FIG. 2 is a cross-sectional view of the reflective display device including the first display substrate taken along line II-II' of FIG. 1.
Figure 3:
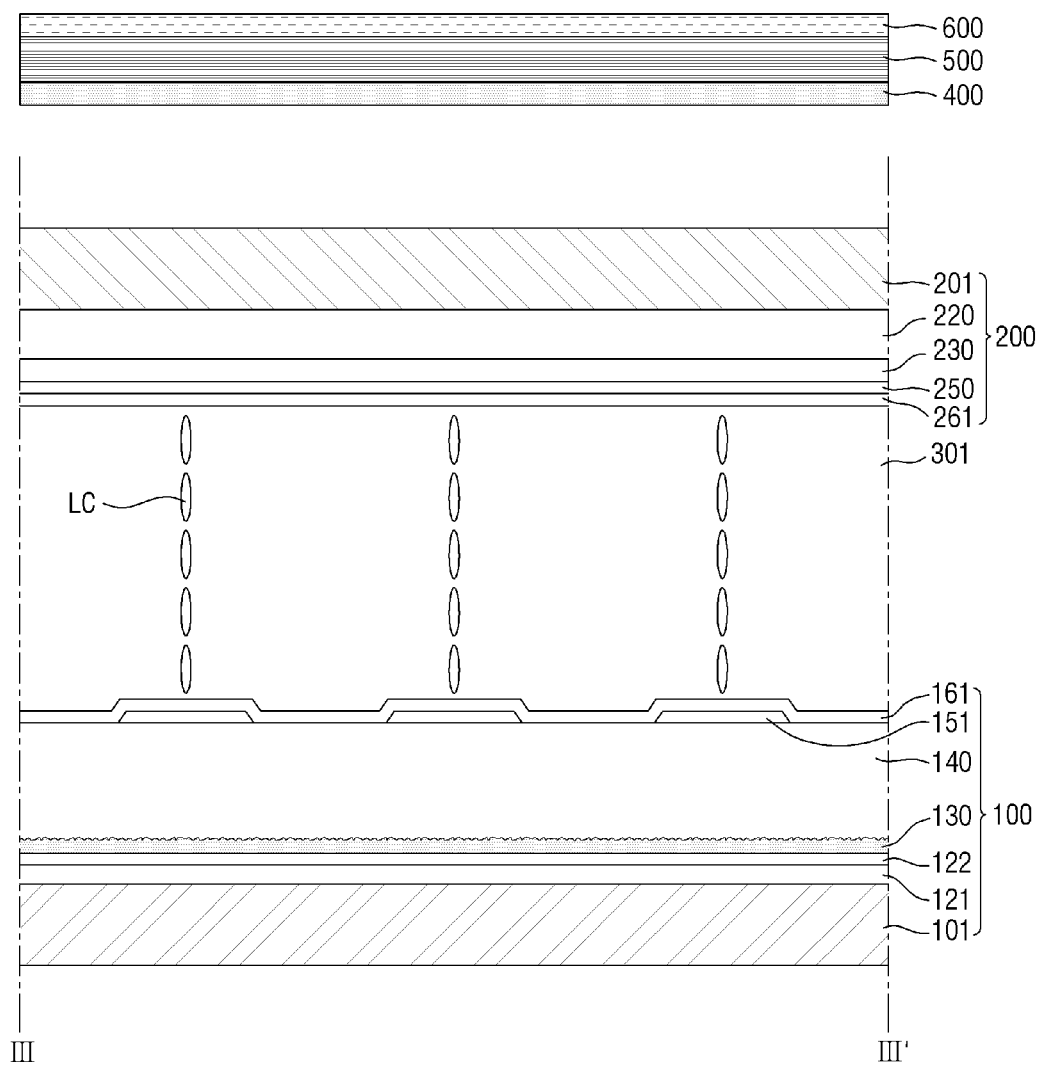
FIG. 3 is a cross-sectional view of the reflective display device including the first display substrate taken along line III-III' of FIG. 1.

FIG. 1 shows a layout of one pixel region of a first display substrate included in a reflective display device according to an exemplary embodiment of the present disclosure. FIG. 2 is a cross-sectional view of the reflective display device including the first display substrate taken along line II-II' of FIG. 1. FIG. 3 is a cross-sectional view of the reflective display device including the first display substrate taken along line III-III' of FIG. 1.

Referring to FIGS. 1 to 3, a reflective display device 1001 according to the present exemplary embodiment includes a first display substrate 100, a second display substrate 200 facing the first display substrate 100, a liquid crystal layer 301 interposed between the first display substrate 100 and the second display substrate 200, a phase delay layer 400 disposed on the second display substrate 200, a reflective polarizing element 500 disposed on the phase delay layer 400, and an absorptive polarizing element 600 disposed on the reflective polarizing element 500. In some exemplary embodiments, the reflective display device 1001 may further include an internal light source (not shown) disposed below the first display substrate 100. In this case, the reflective display device 1001 may be a transflective display device (semi-transmissive semi-reflective display device) that performs a display function in a transmissive mode using an internal light source and a reflective mode using an external light source.

The first display substrate 100 may be a substrate on which a switching element 110 for controlling an alignment direction of a liquid crystal LC in the liquid crystal layer 301 is disposed. The second display substrate 200 may be a counter substrate for interposing the liquid crystal layer 301 between the first display substrate 100 and the second display substrate 200. The reflective display device 1001 may be configured to display an image on the upper surface side (upper side in the drawing) of the second display substrate 200 by substantially using external light (not shown) above the absorptive polarizing element 600.

The first display substrate 100 may include a first insulating substrate 101, the switching element 110 disposed on the first insulating substrate 101, a reflection plate 130 disposed on the switching element 110, and a first electrode 151 disposed on the reflection plate 130.

The first insulating substrate 101 may be a transparent or opaque insulating substrate. For example, the first insulating substrate 101 may be a glass or plastic substrate. In some exemplary embodiments, the first insulating substrate 101 may have flexibility.

The switching element 110 may be disposed on the first insulating substrate 101. The switching element 110 may be a thin film transistor including a gate electrode 111 disposed on the first insulating substrate 101, an active layer 112 disposed on the gate electrode 111, and a source electrode 113 and a drain electrode 114 which are spaced apart from each other on the active layer 112. The gate electrode 111 serving as a control terminal may be connected to a gate line GL to receive a gate driving signal. The source electrode 113 serving as an input terminal may be connected to a data line DL to receive a data driving signal. The drain electrode 114 serving as an output terminal may be electrically connected to the first electrode 151. The active layer 112 may serve as a channel of the thin film transistor such that the channel is turned on or off depending on the voltage applied to the gate electrode 111.

The gate electrode 111 and the active layer 112 may be insulated by an insulating layer 121. A protective layer 122 may be disposed on the active layer 112, the source electrode 113 and the drain electrode 114 to prevent the lower electrodes from being in direct contact with an organic material. The insulating layer 121 and the protective layer 122 may include an inorganic material. Examples of the inorganic material may include, silicon nitride ($SiN_x$), silicon oxide ($SiO_x$), silicon nitride oxide ($SiN_xO_y$) and silicon oxynitride ($SiO_xN_y$). An organic layer 140 may be disposed on the protective layer 122. The organic layer 140 can make the heights of a plurality of components stacked on the first insulating substrate 101 uniform.

In an exemplary embodiment, the reflection plate 130 may be disposed between the protective layer 122 and the organic layer 140. The reflection plate 130 may occupy most of the planar area of the pixel region. The reflection plate 130 may be configured to reflect external light, for example, natural light incident from above the absorptive polarizing element 600 as shown in the drawing, toward the second display substrate 200. For example, the reflection plate 130 may include an opaque metal. Alternatively, the reflection plate 130 may include an opaque metal having a light transmittance of about 50% or less, about 40% or less, about 30% or less, about 20% or less, or about 10% or less. FIG. 2 and the like illustrate a case where the reflection plate 130 is disposed between the protective layer 122 and the organic layer 140 in the first display substrate 100. However, in another exemplary embodiment, the reflection plate 130 may be disposed separately below the first display substrate 100, may be disposed between the first insulating substrate 101 and the insulating layer 121, or may be disposed between the insulating layer 121 and the protective layer 122. Alternatively, the first electrode 151 may be formed as an opaque electrode, and the first electrode 151 itself may be configured as a reflection plate.

The reflection plate 130 may specularly reflect at least a part of external light, and may diffusely reflect at least a part thereof. For example, the reflection plate 130 may specularly reflect at least a part of the light transmitted through the liquid crystal layer 301 and incident on the reflection plate 130, and may diffusely reflect at least a part thereof. In an exemplary embodiment, one surface (upper surface in the drawing) of the reflection plate 130 facing the liquid crystal layer 301 may include an uneven surface having a predetermined surface roughness. In another exemplary embodiment, the reflection plate 130 may include light scattering particles dispersed therein. The reflection plate 130 of the reflective display device 1001, which reflects external light such that the external light substantially contributes to image display, may be configured to perform not only specular reflection but also diffuse reflection, so that the light can be diffused in various directions. Thus, regardless of an incident angle of external light, a high-quality image can be viewed by a viewer.

The first electrode 151 may be disposed on the organic layer 140. The first electrode 151 may be a pixel electrode that is controlled by a data driving signal. The first electrode 151 may be a transparent electrode. As examples of a material for forming the transparent electrode, indium tin oxide, indium zinc oxide and the like may be mentioned. The first electrode 151 may be disposed for each pixel region. The first electrode 151 may include a plurality of fine branch electrodes 151b and may have a slit formed therebetween. For example, the first electrode 151 may include a stem electrode 151a having a substantially cross (+) shape and the fine branch electrodes 151b extending radially from the stem electrode in a direction of approximately 45 degrees. The first electrode 151 can control the alignment direction of the liquid crystal LC by applying an electric field to the liquid crystal layer 301 in cooperation with the second electrode 250 to be described later. In another exemplary embodiment, the first electrode 151 may be configured to perform the same function as the reflection plate 130, in which case the first electrode 151 may be an opaque electrode.

A first alignment layer 161 may be disposed on the first electrode 151. The first alignment layer 161 may be a copolymer of an anhydride-based compound and a diamine-based compound, and may include a polyimide copolymer containing an imide group in a repeating unit, and the like. In an exemplary embodiment, the first alignment layer 161 may be a homeotropic alignment layer having a homeotropically aligned side chain bonded to a main chain.

Next, the second display substrate 200 will be described. The second display substrate 200 may include a second insulating substrate 201, a light blocking member 210 and a color conversion layer 220 disposed on the second insulating substrate 201, and the second electrode 250 disposed on the light blocking member 210 and the color conversion layer 220.

The second insulating substrate 201 may be a transparent insulating substrate. The second insulating substrate 201 may be made transparent so that external light incident from above the absorptive polarizing element 600 and reflected light reflected by the reflection plate 130 can be transmitted through the second insulating substrate 201. The light blocking member 210 may be made of at least a material that absorbs or reflects light of a specific wavelength band to block the transmission of light. For example, the light blocking member 210 may be a black matrix. The light blocking member 210 may be disposed at a boundary between adjacent pixel regions to prevent a color mixture defect.

The color conversion layer 220 may include a material that absorbs a specific wavelength band of transmitted light, or shifts or converts the wavelength of transmitted light to a specific wavelength. That is, the color conversion layer 220 can selectively transmit only light of a specific wavelength band. Further, the color conversion layer 220 is disposed on the second display substrate 200, i.e., between the liquid crystal layer 301 and the phase delay layer 400, so that the color conversion layer 220 allows only the light of a specific wavelength band of the external light to pass therethrough and travel toward the liquid crystal layer 301, thereby facilitating the design of a cell gap of the liquid crystal layer 301, a refractive index anisotropy and the like. In addition, the light reflected by the reflection plate 130 and transmitted through the liquid crystal layer 301 is transmitted through the color conversion layer 220 once again, so that the color purity can be further improved.

An overcoat layer 230 may be disposed under the light blocking member 210 and the color conversion layer 220. The overcoat layer 230 may include an organic material. The overcoat layer 230 can make the heights of a plurality of components stacked on the second insulating substrate 201 uniform.

The second electrode 250 may be disposed under the overcoat layer 230. The second electrode 250 may be a common electrode, which is disposed to cover a plurality of pixel regions and to which a common voltage is applied. The second electrode 250 may form a vertical electric field in the liquid crystal layer 301 in cooperation with the first electrode 151. A second alignment layer 261 may be disposed on the second electrode 250. The second alignment layer 261 may include a polyimide copolymer which is the same as or different from that of the first alignment layer 161. In an exemplary embodiment, the second alignment layer 261 may be a homeotropic alignment layer.

Next, the liquid crystal layer 301 will be described. The liquid crystal layer 301 includes a plurality of liquid crystals LCs. The liquid crystal layer 301 can modulate a polarization state of light transmitted through the liquid crystal layer 301 according to an applied electric field. In an exemplary embodiment, the light transmitted through the liquid crystal layer 301 in a state where an electric field is not applied to the liquid crystal layer 301 may not change its phase, and the light transmitted through the liquid crystal layer 301 in a state where an electric field is applied to the liquid crystal layer 301 may be delayed in phase by about $(2k+1)\lambda/4$ (where k is an integer equal to or greater than 0), and thus, change its polarization state. That is, when the electric field is applied to the liquid crystal layer 301, a $\Delta$nd value of the liquid crystal layer 301 may be about $(2k+1)\lambda/4$, and the liquid crystal layer 301 may function as a $(2k+1)\lambda/4$ phase difference layer. Here, $\Delta$nd denotes the product of the refractive index anisotropy ($\Delta$n) of the liquid crystal layer 301 and the cell gap (d), and $\lambda$ denotes the wavelength of incident light. As a non-limiting example, $\Delta$nd of the liquid crystal layer 301 may be $\lambda/4$ in a state where an electric field is applied to the liquid crystal layer 301.

For example, the liquid crystal LC of the liquid crystal layer 301 is a liquid crystal having a negative dielectric anisotropy, and in an initial alignment state, the major axis of the liquid crystal LC may be oriented in a direction substantially perpendicular to the alignment surface, so that the liquid crystal LC can be maintained in a stabilized state. As used herein, an initial alignment state means the alignment state of the liquid crystal LC in a state where an electric field is not formed in the liquid crystal layer 301. When an electric field is applied to the liquid crystal layer 301, the liquid crystal LC may be tilted such that its major axis is oriented at a predetermined angle with respect to the direction of the electric field by the vertical electric field formed by the first electrode 151 and the second electrode 250. In some exemplary embodiments, the liquid crystal LC may be substantially vertically aligned at a predetermined pre-tilt angle.

Next, the phase delay layer 400, the reflective polarizing element 500 and the absorptive polarizing element 600 will be described.

The phase delay layer 400 may be disposed on the second display substrate 200. The phase delay layer 400 can modulate the polarization state of the transmitted light. For example, the phase delay layer 400 may change linearly polarized light to circularly polarized light or elliptically polarized light, or may change circularly polarized light or elliptically polarized light to linearly polarized light by delaying the phase of any one of mutually orthogonal components of the transmitted light. The phase delay layer 400 may include a polyether sulfone (PES) or cycloolefin polymer (COP), but the present disclosure is not limited thereto.

A phase delay value of the phase delay layer 400 may be about $(2k+1)\lambda/4$ (where k is an integer equal to or greater than 0). That is, the phase delay layer 400 may be a $(2k+1)\lambda/4$ phase difference layer which delays the phase of the transmitted light by about $(2k+1)\lambda/4$. As a non-limiting example, the phase delay value of the phase delay layer 400 may be $\lambda/4$.

In an exemplary embodiment, in a state where an electric field is applied to the liquid crystal layer 301, the liquid crystal layer 301 and the phase delay layer 400 may delay the phase of the transmitted light in cooperation with each other by $(k+1)\lambda/2$ (where k is an integer equal to or greater than 0). Further, in a state where an electric field is not applied to the liquid crystal layer 301, the liquid crystal layer 301 and the phase delay layer 400 may delay the phase of the transmitted light in cooperation with each other by $(2k+1)\lambda/4$ (where k is an integer equal to or greater than 0).

In some exemplary embodiments, one or more phase delay layers may be further disposed between the second display substrate 200 and the reflective polarizing element 500.

The reflective polarizing element 500 may be disposed on the phase delay layer 400. When light is incident upon the reflective polarizing element 500, the reflective polarizing element 500 may transmit light polarized in one direction and reflect light polarized in the other direction. In an exemplary embodiment, the reflective polarizing element 500 may have a transmission axis in a direction parallel to a first direction X. In this case, the light transmitted through the reflective polarizing element 500 may have a polarization state containing a polarization component oscillating substantially in the first direction X, and the light reflected by the reflective polarizing element 500 may have a polarization state containing a polarization component substantially in a second direction Y.

Figure 4:
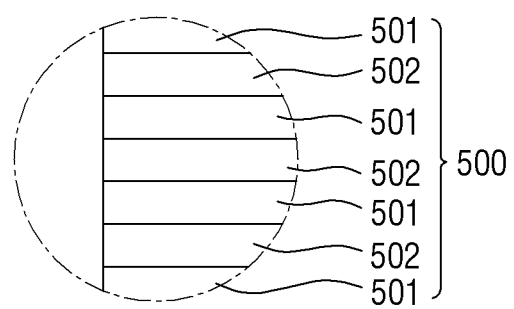
FIG. 4 is an enlarged cross-sectional view of region A in FIG. 2.

FIG. 4 is an enlarged cross-sectional view of region A in FIG. 2.

Referring to FIG. 4, the reflective polarizing element 500 may be a film type reflective polarizing element including a plurality of first refraction layers 501 and a plurality of second refraction layers 502 which are stacked alternately. The first refraction layers 501 and the second refraction layers 502 may be disposed in direct contact with each other. The first refraction layers 501 and the second refraction layers 502 have substantially the same refractive index in one in-plane direction (e.g., the first direction) and different refractive indexes in the other in-plane direction (e.g., the second direction), so that at least a part of light can be reflected at each interface. For example, the first refraction layers 501 may be uniaxially stretched PEN layers, and the second refraction layers 502 may be uniaxially stretched coPEN layers. FIG. 4 and the like illustrate a case where the reflective polarizing element 500 includes the first refraction layers 501 and the second refraction layers 502 which are stacked alternately, but the present disclosure is not limited thereto. The reflective polarizing element 500 may be a reflective polarizing element using a cholesteric liquid crystal, or a reflective polarizing element using a wire grid pattern.

Referring again to FIGS. 1 to 3, the absorptive polarizing element 600 may be disposed on the reflective polarizing element 500. When light is incident upon the absorptive polarizing element 600, the absorptive polarizing element 600 may transmit light polarized in one direction and absorb light polarized in the other direction. In an exemplary embodiment, the transmission axis of the absorptive polarizing element 600 may be parallel to the transmission axis of the reflective polarizing element 500. That is, the transmission axis of the absorptive polarizing element 600 may be substantially parallel to the first direction X. In this case, the light transmitted through the absorptive polarizing element 600 may have a polarization state containing a polarization component oscillating substantially in the first direction X. In an exemplary embodiment, the absorptive polarizing element 600 may be an absorptive polarizing element obtained by adsorbing iodine on a PVA film and stretching it. In exemplary some embodiments, one or more polarizing elements may be further disposed between the absorptive polarizing element 600 and the reflective polarizing element 500. In this case, the transmission axes of the absorptive polarizing element 600, the reflective polarizing element 500 and the additional polarizing element may be parallel to each other.

Although not shown in the drawing, a window glass (not shown) may be further disposed on the absorptive polarizing element 600. The window glass may be disposed on the front surface of the reflective display device 1001 to protect a display panel and the like provided internally, and form a display surface on which an image is viewed. In this case, the external light incident on the absorptive polarizing element 600 through the window glass from above the window glass may be in an unpolarized state. As used herein, unpolarized light refers to light that does not include only a polarization component in a specific direction, i.e., light that is not polarized only in a specific direction, which means light including a random polarization component. As an example of unpolarized light, natural light may be mentioned.

Hereinafter, an optical path and a polarization state of light transmitted through the reflective display device 1001 according to the present embodiment will be described in detail with reference to FIGS. 5 and 6.

Figure 5:
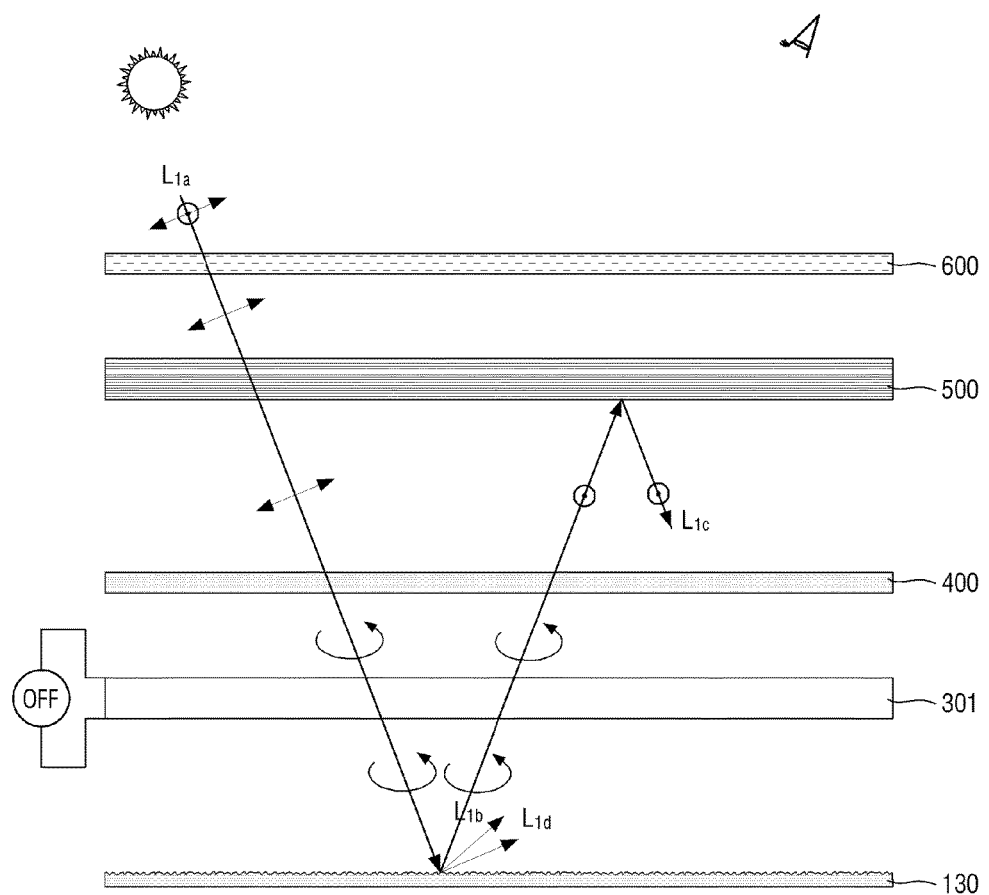
FIG. 5 is a schematic view showing an optical path when an electric field is not applied to the liquid crystal layer of the reflective display device of FIG. 1.

FIG. 5 is a schematic view showing an optical path when an electric field is not applied to the liquid crystal layer of the reflective display device of FIG. 1. FIG. 6 is a schematic view showing an optical path when an electric field is applied to the liquid crystal layer of the reflective display device of FIG. 1.

First, referring to FIG. 5, external light $L_{1a}$ incident on the reflective display device from above the absorptive polarizing element 600 in a state where an electric field is not applied to the liquid crystal layer 301 may sequentially pass through the absorptive polarizing element 600, the reflective polarizing element 500, the phase delay layer 400 and the liquid crystal layer 301, and travel toward the reflection plate 130.

Specifically, the external light $L_{1a}$ incident on the absorptive polarizing element 600 may be in an unpolarized state. The external light $L_{1a}$ is polarized and separated by the absorptive polarizing element 600. The light transmitted through the absorptive polarizing element 600 and traveling toward the reflective polarizing element 500 may be light having a polarization component oscillating in a transmission axis direction (e.g., the first direction). On the other hand, light having a polarization component oscillating in an absorption axis direction (e.g., the second direction) may be absorbed by the absorptive polarizing element 600. The light having a polarization component oscillating in the first direction may pass through the reflective polarizing element 500 substantially as it is.

The light transmitted through the reflective polarizing element 500 may be delayed in phase by the phase delay layer 400 and change its polarization state. In an exemplary embodiment, the phase delay value of the phase delay layer 400 may be λ/4, and the light that is linearly polarized in the first direction and incident on the phase delay layer 400 may be circularly polarized while passing through the phase delay layer 400. The light transmitted through the phase delay layer 400 may be circularly polarized in a counter-clockwise direction, but the present disclosure is not limited thereto. In another exemplary embodiment, the light may be circularly polarized in a clockwise direction.

In a state where an electric field is not applied to the liquid crystal layer 301, the light transmitted through the liquid crystal layer 301 may not change its polarization state. That is, the light transmitted through the liquid crystal layer 301 and traveling toward the reflection plate 130 may be counter-clockwise circularly polarized light as it is.

In an exemplary embodiment, in a state where an electric field is not applied to the liquid crystal layer 301, the polarization state of the light transmitted through the liquid crystal layer 301 and traveling toward the reflection plate 130 may have a phase delayed by $(2k+1)\lambda/4$ (where k is an integer equal to or greater than 0) as compared with the polarization state of the light transmitted through the absorptive polarizing element 600 and traveling toward the reflective polarizing element 500. FIG. 5 illustrates a case where a phase is delayed by λ/4 (k=0), but the present disclosure is not limited thereto.

At least a part of the light reflected by the reflection plate 130, for example, specularly reflected light $L_{1b}$, may proceed to sequentially pass through the liquid crystal layer 301 and the phase delay layer 400.

The light $L_{1b}$ specularly reflected by the reflection plate 130 may maintain the same polarization state as the light incident on the reflection plate 130. Further, in a state where an electric field is not applied to the liquid crystal layer 301, the polarization state of light transmitted through the liquid crystal layer 301 may not change. That is, the light transmitted through the liquid crystal layer 301 and traveling toward the phase delay layer 400 may be counter-clockwise circularly polarized light as it is.

The light transmitted through the liquid crystal layer 301 may be delayed in phase by the phase delay layer 400, and change its polarization state. For example, the counter-clockwise circularly polarized light incident on the phase delay layer 400 may be linearly polarized in the second direction while passing through the phase delay layer 400.

The light transmitted through the phase delay layer 400 and traveling toward the reflective polarizing element 500, i.e., the light having a polarization component oscillating in the second direction, may be reflected by the reflective polarizing element 500. Light $L_{1c}$ reflected by the reflective polarizing element 500 may travel toward the reflection plate 130 again. The reflected light $L_{1c}$ may be retro-reflected between the reflective polarizing element 500 and the reflection plate 130 and contribute to image display, thereby increasing the utilization efficiency of light.

On the other hand, at least a part of the light reflected by the reflection plate 130, for example, diffusely reflected light $L_{1d}$ may be at least partly depolarized, and may be retro-reflected between the reflective polarizing element 500 and the reflection plate 130 and contribute to image display.

Figure 6:
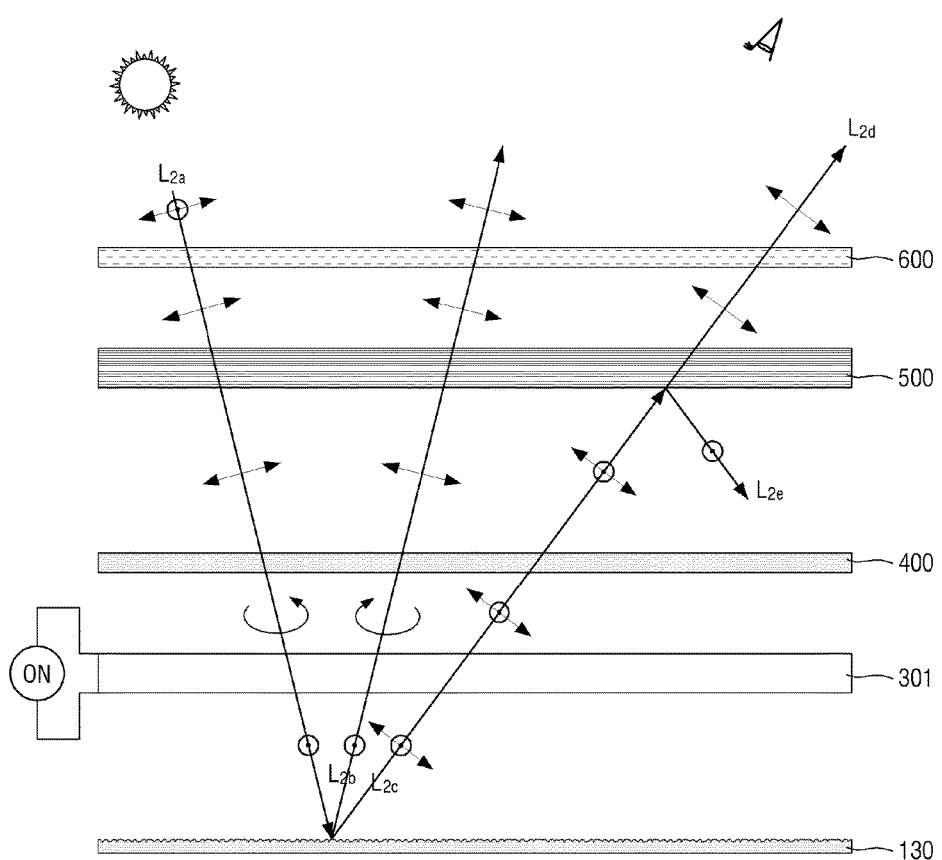
FIG. 6 is a schematic view showing an optical path when an electric field is applied to the liquid crystal layer of the reflective display device of FIG. 1.

Then, referring to FIG. 6, external light $L_{2a}$ incident on the reflective display device from above the absorptive polarizing element 600 in a state where an electric field is applied to the liquid crystal layer 301 may sequentially pass through the absorptive polarizing element 600, the reflective polarizing element 500, the phase delay layer 400 and the liquid crystal layer 301 and travel toward the reflection plate 130.

Specifically, the external light $L_{2a}$ incident on the absorptive polarizing element 600 may be in an unpolarized state. The external light $L_{2a}$ may pass through the absorptive polarizing element 600, the reflective polarizing element 500, and the phase delay layer 400, as described with reference to FIG. 5.

In a state where an electric field is applied to the liquid crystal layer 301, the light passing through the liquid crystal layer 301 may be delayed in phase by $\lambda/4$. That is, the counter-clockwise circularly polarized light transmitted through the phase delay layer 400 and traveling toward the liquid crystal layer 301 may be linearly polarized in the second direction while passing through the liquid crystal layer 301.

In an exemplary embodiment, in a state where an electric field is applied to the liquid crystal layer 301, the polarization state of the light transmitted through the liquid crystal layer 301 and traveling toward the reflection plate 130 may have a phase delayed by $(k+1)\lambda/2$ (where k is an integer equal to or greater than 0) as compared with the polarization state of the light transmitted through the absorptive polarizing element 600 and traveling toward the reflective polarizing element 500. FIG. 6 illustrates a case where a phase is delayed by $\lambda/2$ (k=0), but the present disclosure is not limited thereto.

At least a part of the light reflected by the reflection plate 130, for example, specularly reflected light $L_{2b}$, may be sequentially transmitted through the liquid crystal layer 301, the phase delay layer 400, the reflective polarizing element 500 and the absorptive polarizing element 600, and then viewed by the viewer.

The light $L_{2b}$ specularly reflected by the reflection plate 130 may maintain the same polarization state as the light incident on the reflection plate 130. Further, in a state where an electric field is applied to the liquid crystal layer 301, the light transmitted through the liquid crystal layer 301 may be delayed in phase by $\lambda/4$. That is, the light linearly polarized in the second direction, which is reflected by the reflection plate 130 and travels toward the liquid crystal layer 301, may be circularly polarized in a clockwise direction while passing through the liquid crystal layer 301.

The light transmitted through the liquid crystal layer 301 may be delayed in phase by the phase delay layer 400 and change its polarization state. For example, the clockwise circularly polarized light incident on the phase delay layer 400 may be linearly polarized in the first direction while passing through the phase delay layer 400.

The light transmitted through the phase delay layer 400 and traveling toward the reflective polarizing element 500, i.e., the light having a polarization component oscillating in the first direction, may pass through the reflective polarizing element 500 and the absorptive polarizing element 600 as it is, and contribute to image display.

On the other hand, at least a part of the light reflected by the reflection plate 130, for example, diffusely reflected light $L_{2c}$ may be at least partially depolarized and have an unpolarized state. The unpolarized light may sequentially pass through the liquid crystal layer 301 and the phase delay layer 400 and then travel toward the reflective polarizing element 500. The light transmitted through the phase delay layer 400 and traveling toward the reflective polarizing element 500 is polarized and separated by the reflective polarizing element 500. Light $L_{2d}$ having a polarization component parallel to the transmission axis of the reflective polarizing element 500, for example, light $L_{2d}$ linearly polarized in the first direction, may pass through the reflective polarizing element 500 and the absorptive polarizing element 600 and contribute to image display. Light $L_{2e}$ having a polarization component parallel to the reflection axis of the reflective polarizing element 500, for example, light $L_{2e}$ linearly polarized in the second direction, may travel toward the reflection plate 130 again. The reflected light $L_{2e}$ may be retro-reflected between the reflective polarizing element 500 and the reflection plate 130 and contribute to image display.

The reflective display device according to the present exemplary embodiment is configured to delay a phase by $(2k+1)\lambda/4$ in the optical path from the external light source to the reflection plate 130 in a state where an electric field is not applied to the liquid crystal layer 301, and delay a phase by $(k+1)\lambda/2$ in the optical path from the external light source to the reflection plate 130 in a state where an electric field is applied to the liquid crystal layer 301. Accordingly, the amount of light lost can be minimized and external light can be used for image display. In addition, since the reflection plate 130 and the reflective polarizing element 500 are arranged with the liquid crystal layer 301 interposed therebetween, light can be reused, thereby improving the utilization efficiency of light.

Hereinafter, a reflective display device according to another exemplary embodiment of the present disclosure will be described. However, a description of the same configuration as that of the reflective display device according to the above-described embodiment is omitted, and it will be apparent to those skilled in the art from the accompanying drawings.

Figure 7:
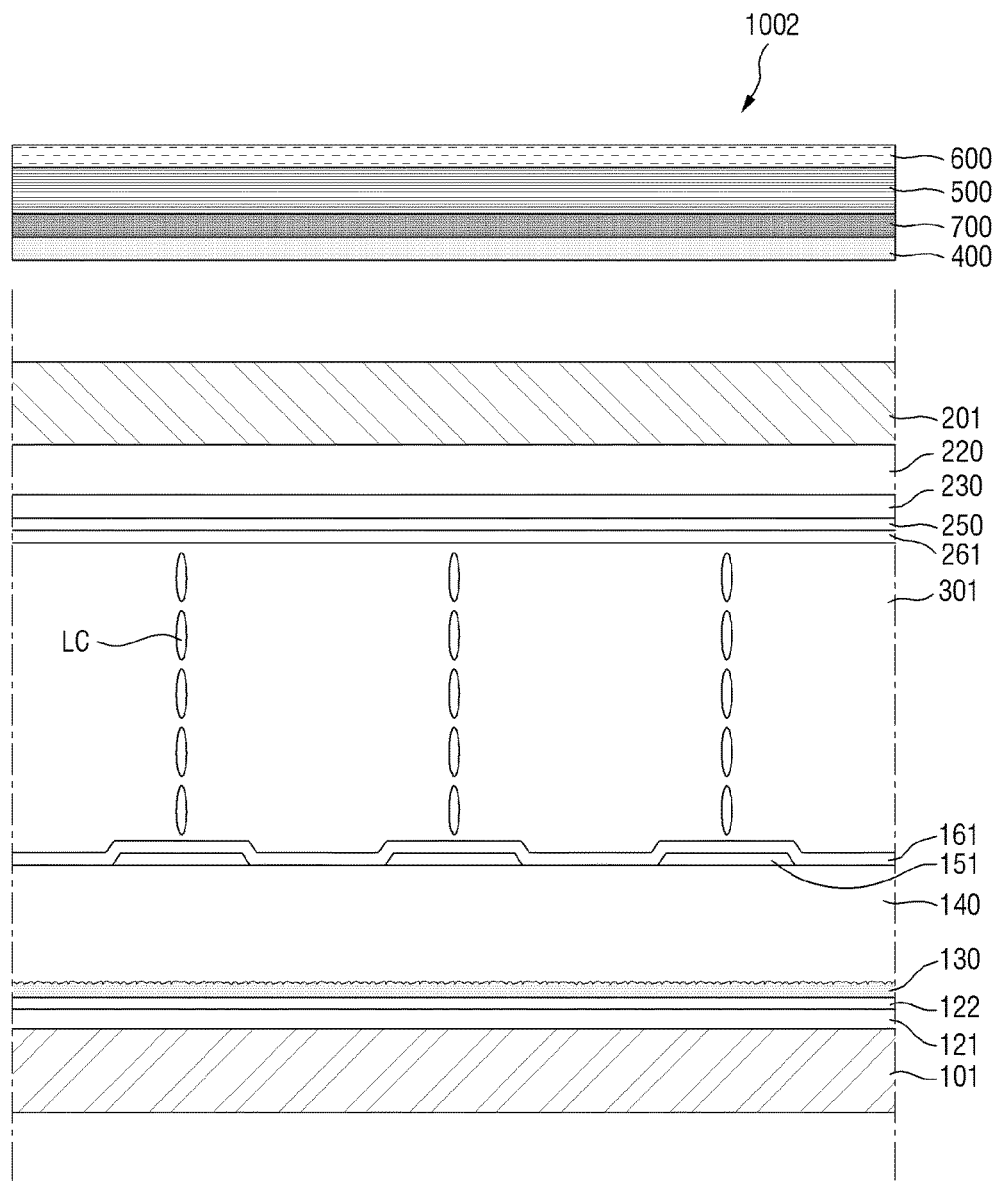
FIG. 7 is a cross-sectional view of a reflective display device according to another embodiment of the present disclosure.

FIG. 7 is a cross-sectional view of a reflective display device according to another exemplary embodiment of the present disclosure.

Referring to FIG. 7, a reflective display device 1002 according to the present exemplary embodiment includes a first display substrate, a second display substrate, a liquid crystal layer 301, a first phase delay layer 400 disposed on the liquid crystal layer 301, a reflective polarizing element 500 disposed on the first phase delay layer 400, and an absorptive polarizing element 600 disposed on the reflective polarizing element 500. However, the reflective display device 1002 is different from the reflective display device 1001 shown in FIG. 3 and the like in that the reflective display device 1002 further includes a second phase delay layer 700 disposed between the liquid crystal layer 301 and the reflective polarizing element 500.

A phase delay value of the first phase delay layer 400 may be about $(2k+1)\lambda/4$ (where k is an integer equal to or greater than 0), and a phase delay value of the second phase delay layer 700 may be about $(k+1)\lambda/2$. That is, the second phase delay layer 700 may delay the phase of the transmitted light by about $(k+1)\lambda/2$. As a non-limiting example, the phase delay value of the second phase delay layer 700 may be $\lambda/2$.

In an exemplary embodiment, in a state where an electric field is applied to the liquid crystal layer 301, the liquid crystal layer 301, the first phase delay layer 400 and the second phase delay layer 700 may delay the phase of the transmitted light in cooperation with each other by $(k+2)\lambda/2$ (where k is an integer equal to or greater than 0). Further, in a state where an electric field is not applied to the liquid crystal layer 301, the liquid crystal layer 301, the first phase delay layer 400 and the second phase delay layer 700 may delay the phase of the transmitted light in cooperation with each other by $(2k+3)\lambda/4$ (where k is an integer equal to or greater than 0).

FIG. 7 and the like illustrate a case where the second phase delay layer 700 is disposed on the first phase delay layer 400. However, in another embodiment, the first phase delay layer 400 may be disposed on the second phase delay layer 700. Hereinafter, an optical path and a polarization state of light transmitted through the reflective display device 1002 according to the present exemplary embodiment will be described in detail with reference to FIGS. 8 and 9.

Figure 8:
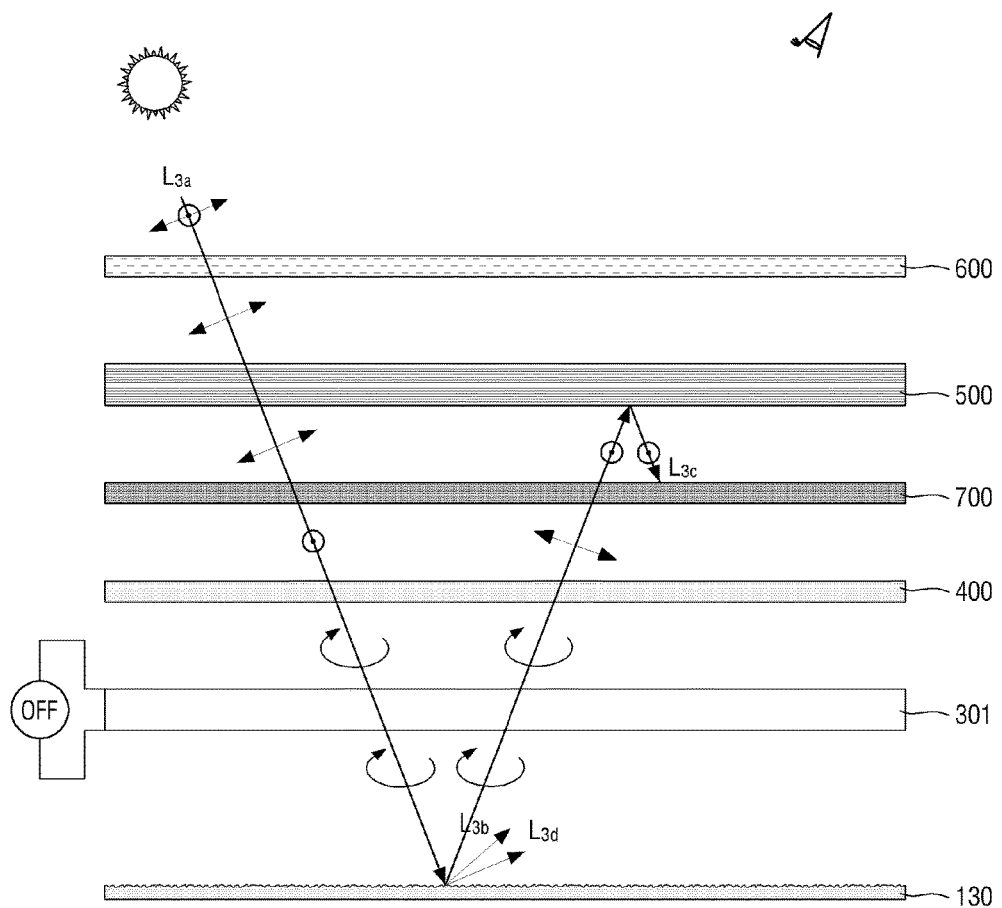
FIG. 8 is a schematic view showing an optical path when an electric field is not applied to the liquid crystal layer of the reflective display device of FIG. 7.
Figure 9:
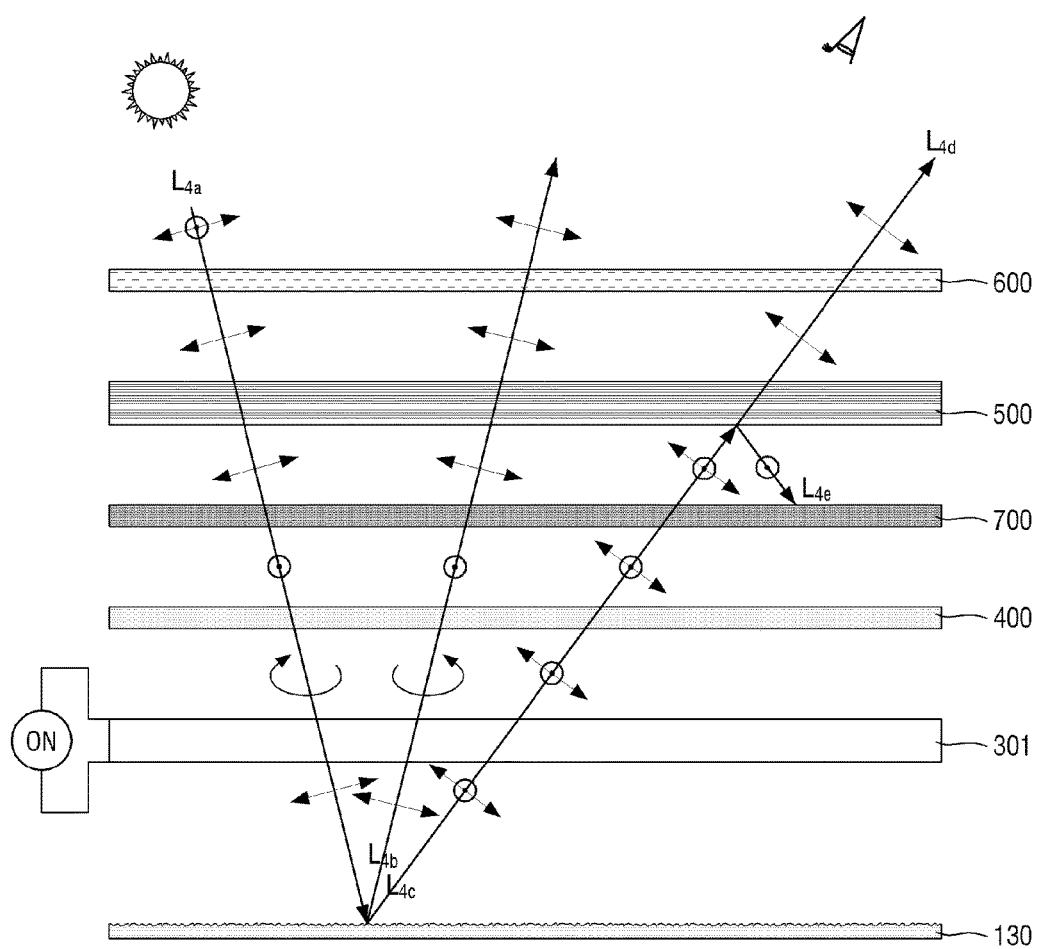
FIG. 9 is a schematic view showing an optical path when an electric field is applied to the liquid crystal layer of the reflective display device of FIG. 7.

FIG. 8 is a schematic view showing an optical path when an electric field is not applied to the liquid crystal layer of the reflective display device of FIG. 7. FIG. 9 is a schematic view showing an optical path when an electric field is applied to the liquid crystal layer of the reflective display device of FIG. 7.

First, referring to FIG. 8, external light $L_{3a}$ incident on the reflective display device from above the absorptive polarizing element 600 in a state where an electric field is not applied to the liquid crystal layer 301 may sequentially pass through the absorptive polarizing element 600, the reflective polarizing element 500, the second phase delay layer 700, the first phase delay layer 400 and the liquid crystal layer 301, and travel toward the reflection plate 130.

Specifically, the external light $L_{3a}$ incident on the absorptive polarizing element 600 may be in an unpolarized state. The external light $L_{3a}$ is polarized and separated by the absorptive polarizing element 600. The light transmitted through the absorptive polarizing element 600 and traveling toward the reflective polarizing element 500 may be light having a polarization component oscillating in the transmission axis direction (e.g., the first direction). On the other hand, light having a polarization component oscillating in the absorption axis direction (e.g., the second direction) may be absorbed by the absorptive polarizing element 600. The light having a polarization component oscillating in the first direction may pass through the reflective polarizing element 500 substantially as it is.

The light transmitted through the reflective polarizing element 500 may be delayed in phase by the second phase delay layer 700 and change its polarization state. In an exemplary embodiment, the phase delay value of the second phase delay layer 700 may be $\lambda/4$, and the light that is linearly polarized in the first direction and incident on the second phase delay layer 700 may be linearly polarized in the second direction while passing through the second phase delay layer 700.

Then, the light transmitted through the second phase delay layer 700 may be delayed in phase by the first phase delay layer 400, and change its polarization state again. In an exemplary embodiment, the phase delay value of the first phase delay layer 400 may be $\lambda/4$, and the light linearly polarized in the second direction and incident on the first phase delay layer 400 may be circularly polarized while passing through the first phase delay layer 400. The light transmitted through the first phase delay layer 400 may be circularly polarized in a clockwise direction, but the present disclosure is not limited thereto.

In a state where an electric field is not applied to the liquid crystal layer 301, the polarization state of light transmitted through the liquid crystal layer 301 may not change. That is, the light transmitted through the liquid crystal layer 301 and traveling toward the reflection plate 130 may be clockwise circularly polarized light as it is.

In an exemplary embodiment, in a state where an electric field is applied to the liquid crystal layer 301, the polarization state of the light transmitted through the liquid crystal layer 301 and traveling toward the reflection plate 130 may have a phase delayed by $(2k+3)\lambda/4$ (where k is an integer equal to or greater than 0) as compared with the polarization state of the light transmitted through the absorptive polarizing element 600 and traveling toward the reflective polarizing element 500. FIG. 8 illustrates a case where a phase is delayed by $3\lambda/4$ (k=0), but the present disclosure is not limited thereto.

At least a part of the light reflected by the reflection plate 130, for example, specularly reflected light $L_{3b}$, may sequentially pass through the first phase delay layer 400 and the second phase delay layer 700.

The light $L_{3b}$ specularly reflected by the reflection plate 130 may maintain the same polarization state as the light incident on the reflection plate 130. Further, in a state where an electric field is not applied to the liquid crystal layer 301, the polarization state of light transmitted through the liquid crystal layer 301 may not change. That is, the light transmitted through the liquid crystal layer 301 and traveling toward the first phase delay layer 400 may be clockwise circularly polarized light as it is.

The light transmitted through the liquid crystal layer 301 may be delayed in phase by the first phase delay layer 400, and change its polarization state. For example, the clockwise circularly polarized light incident on the first phase delay layer 400 may be linearly polarized in the first direction while passing through the phase delay layer 400.

Then, the light transmitted through the first phase delay layer 400 may be delayed in phase by the second phase delay layer 700, and change its polarization state again. For example, the light that is linearly polarized in the first direction and incident on the second phase delay layer 700 may be linearly polarized in the second direction while passing through the second phase delay layer 700.

The light transmitted through the second phase delay layer 700 and traveling toward the reflective polarizing element 500, i.e., the light having a polarization component oscillating in the second direction, may be reflected by the reflective polarizing element 500. Light $L_{3c}$ reflected by the reflective polarizing element 500 may travel toward the reflection plate 130 again. The reflected light $L_{3c}$ may be retro-reflected between the reflective polarizing element 500 and the reflection plate 130 and contribute to image display.

On the other hand, at least a part of the light reflected by the reflection plate 130, for example, diffusely reflected light $L_{3d}$ may be at least partly depolarized, and may be retro-reflected between the reflective polarizing element 500 and the reflection plate 130 and contribute to image display.

Then, referring to FIG. 9, in a state where an electric field is applied to the liquid crystal layer 301, external light $L_{4a}$ incident on the reflective display device from above the absorptive polarizing element 600 may sequentially pass through the absorptive polarizing element 600, the reflective polarizing element 500, the phase delay layer 400 and the liquid crystal layer 301 and travel toward the reflection plate 130.

Specifically, the external light $L_{4a}$ incident on the absorptive polarizing element 600 may be in an unpolarized state. The external light $L_{4a}$ may pass through the absorptive polarizing element 600, the reflective polarizing element 500, the second phase delay layer 700 and the first phase delay layer 400, as described with reference to FIG. 8.

In a state where an electric field is applied to the liquid crystal layer 301, the light passing through the liquid crystal layer 301 may be delayed in phase by $\lambda/4$. That is, the clockwise circularly polarized light transmitted through the first phase delay layer 400 and traveling toward the liquid crystal layer 301 may be transmitted through the liquid crystal layer 301 and linearly polarized in the first direction.

In an exemplary embodiment, in a state where an electric field is applied to the liquid crystal layer 301, the polarization state of the light transmitted through the liquid crystal layer 301 and traveling toward the reflection plate 130 may have a phase delayed by $(k+2)\lambda/2$ (where k is an integer equal to or greater than 0) as compared with the polarization state of the light transmitted through the absorptive polarizing element 600 and traveling toward the reflective polarizing element 500. FIG. 9 illustrates a case where a phase is delayed by $\lambda$(k=0), but the present disclosure is not limited thereto.

At least a part of the light reflected by the reflection plate 130, for example, specularly reflected light $L_{4b}$, may be sequentially transmitted through the liquid crystal layer 301, the first phase delay layer 400, the second phase delay layer 700, the reflective polarizing element 500 and the absorptive polarizing element 600, and then viewed by the viewer.

The light $L_{4b}$ specularly reflected by the reflection plate 130 may maintain the same polarization state as the light incident on the reflection plate 130. Further, in a state where an electric field is applied to the liquid crystal layer 301, the light transmitted through the liquid crystal layer 301 may be delayed in phase by $\lambda/4$. That is, the light linearly polarized in the first direction, which is reflected by the reflection plate 130 and travels toward the liquid crystal layer 301, may be circularly polarized in a counter-clockwise direction while passing through the liquid crystal layer 301.

The light transmitted through the liquid crystal layer 301 may be delayed in phase by the phase delay layer 400 and change its polarization state. For example, the counter-clockwise circularly polarized light incident on the first phase delay layer 400 may be linearly polarized in the second direction while passing through the first phase delay layer 400.

Then, the light transmitted through the first phase delay layer 400 may be delayed in phase by the second phase delay layer 700, and change its polarization state again. For example, the light that is linearly polarized in the second direction and incident on the second phase delay layer 700 may be linearly polarized in the first direction while passing through the second phase delay layer 700.

The light transmitted through the second phase delay layer 700 and traveling toward the reflective polarizing element 500, i.e., the light having a polarization component oscillating in the first direction, may pass through the reflective polarizing element 500 and the absorptive polarizing element 600 as it is, and contribute to image display.

On the other hand, at least a part of the light reflected by the reflection plate 130, for example, diffusely reflected light $L_{4c}$ may be at least partially depolarized and have an unpolarized state. The unpolarized light may sequentially pass through the liquid crystal layer 301, the first phase delay layer 400 and the second phase delay layer 700 and then travel toward the reflective polarizing element 500. The light transmitted through the second phase delay layer 700 and traveling toward the reflective polarizing element 500 is polarized and separated by the reflective polarizing element 500. Light $L_{4d}$ having a polarization component parallel to the transmission axis of the reflective polarizing element 500, for example, light $L_{4d}$ linearly polarized in the first direction, may pass through the reflective polarizing element 500 and the absorptive polarizing element 600 and contribute to image display. Light $L_{4e}$ having a polarization component parallel to the reflection axis of the reflective polarizing element 500, for example, light $L_{4e}$ linearly polarized in the second direction, may travel toward the reflection plate 130 again. The reflected light $L_{4e}$ may be retro-reflected between the reflective polarizing element 500 and the reflection plate 130 and contribute to image display.

The reflective display device according to the present exemplary embodiment is configured to delay a phase by $(2k+3)\lambda/4$ in the optical path from the external light source to the reflection plate 130 in a state where an electric field is not applied to the liquid crystal layer 301, and delay a phase by $(k+2)\lambda/2$ in the optical path from the external light source to the reflection plate 130 in a state where an electric field is applied to the liquid crystal layer 301. Accordingly, the amount of light lost can be minimized.

Figure 10:
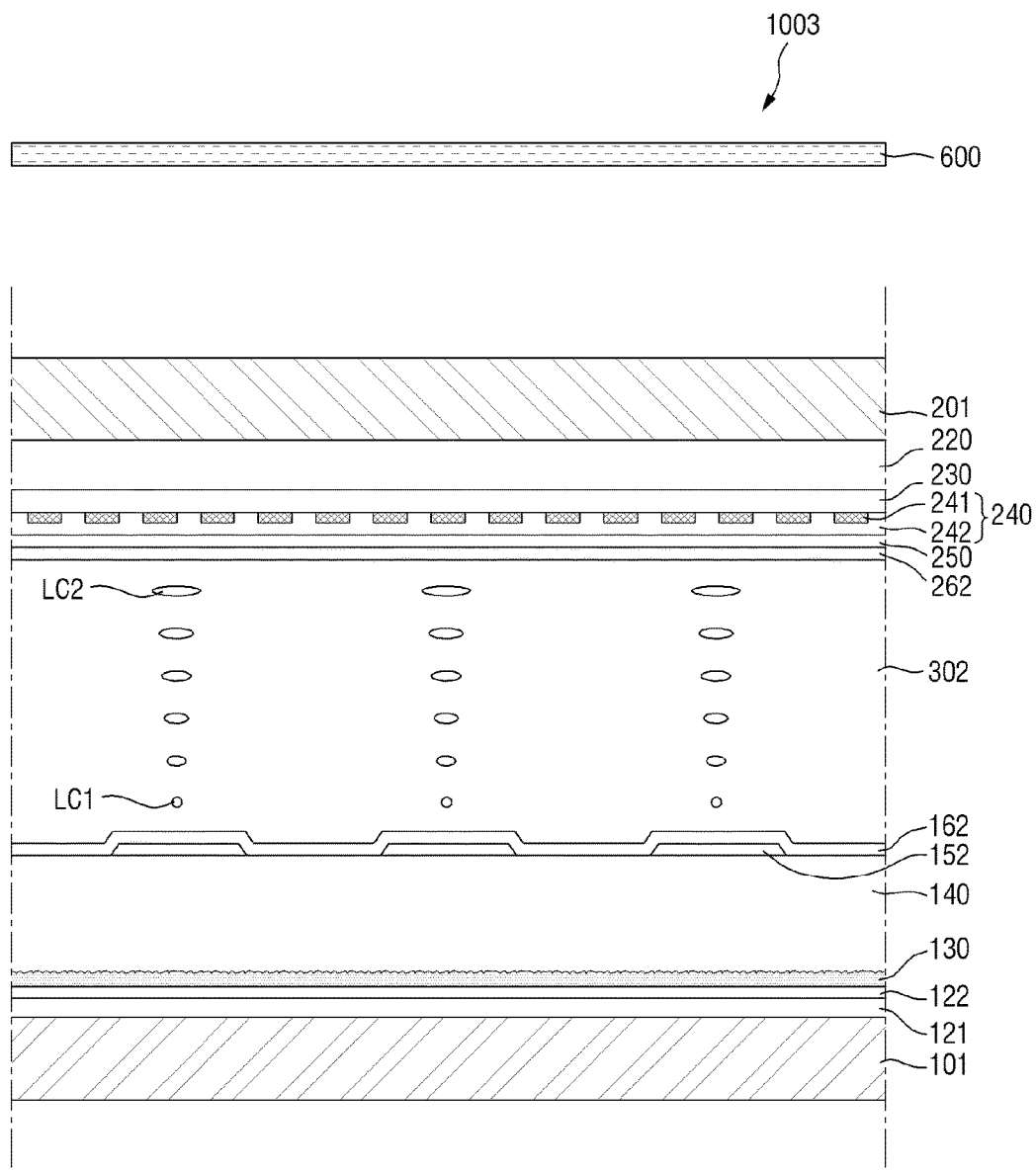
FIG. 10 is a cross-sectional view of a reflective display device according to still another embodiment of the present disclosure.

FIG. 10 is a cross-sectional view of a reflective display device according to still another exemplary embodiment of the present disclosure.

Referring to FIG. 10, a reflective display device 1003 according to the present exemplary embodiment includes a first display substrate, a second display substrate, a liquid crystal layer 302, a reflective polarizing element 240 disposed on the liquid crystal layer 302, and an absorptive polarizing element 600 disposed on the reflective polarizing element 240. However, the reflective display device 1003 is different from the reflective display device 1001 shown in FIG. 3 and the like in that the reflective polarizing element 240 is disposed between the liquid crystal layer 302 and the second insulating substrate 201.

In an exemplary embodiment, the reflective polarizing element 240 may be disposed between the overcoat layer 230 and the second electrode 250. When light is incident upon the reflective polarizing element 240, the reflective polarizing element 240 may transmit light polarized in one direction and reflect light polarized in the other direction. In an exemplary embodiment, the reflective polarizing element 240 may have a transmission axis in a direction parallel to the first direction (horizontal direction in the drawing). In this case, the light transmitted through the reflective polarizing element 240 may have a polarization state containing a polarization component oscillating in the first direction, and the light reflected by the reflective polarizing element 240 may have a polarization state containing a polarization component oscillating in the second direction intersecting the first direction. In this case, the transmission axes of the reflective polarizing element 240 and the absorptive polarizing element 600 may be substantially parallel to each other.

For example, the reflective polarizing element 240 may include a wire grid pattern 241. The wire grid pattern 241 includes a plurality of wire grids repeatedly arranged and spaced apart from each other in one direction. The wire grid pattern 241 may be made of a conductive metal such as aluminum (Al), silver (Ag), copper (Cu), and/or nickel (Ni), but is not limited thereto. A capping layer 242 may be disposed on the wire grid pattern 241 to protect the wire grid pattern 241.

The liquid crystal layer 302 can modulate a polarization state of light transmitted through the liquid crystal layer 302 according to an applied electric field. In an exemplary embodiment, the light transmitted through the liquid crystal layer 302 in a state where an electric field is not applied to the liquid crystal layer 302 may be delayed in phase by about $(2k+1)\lambda/4$ (where k is an integer equal to or greater than 0), and change its polarization state. That is, in a state where an electric field is not applied to the liquid crystal layer 302, a Δnd value of the liquid crystal layer 302 may be about $(2k+1)\lambda/4$, and the liquid crystal layer 302 may function as a $(2k+1)\lambda/4$ phase difference layer. As a non-limiting example, in a state where an electric field is not applied to the liquid crystal layer 302, Δnd of the liquid crystal layer 302 may be $\lambda/4$. Further, in a state where an electric field is applied to the liquid crystal layer 302, the light passing through the liquid crystal layer 302 may not change its phase.

For example, liquid crystals LC1 and LC2 of the liquid crystal layer 302 are liquid crystals having a positive dielectric anisotropy, and the liquid crystal layer 302 may include a twisted nematic liquid crystal. In an initial alignment state, the liquid crystals LC1 and LC2 are substantially horizontally aligned with respect to the alignment surface, and the major axes of the liquid crystals LC1 and LC2 in the liquid crystal layer 302 may be arranged in a gradually twisted state depending on the position in the thickness direction (vertical direction in the drawing), so that the liquid crystals LC1 and LC2 can be maintained in a stabilized state. In an exemplary embodiment, the major axis direction of the first liquid crystal LC1 adjacent to a first alignment layer 162 may intersect the major axis direction of the second liquid crystal LC2 adjacent to a second alignment layer 262, and the major axis direction of the second liquid crystal LC2 may be substantially parallel to the transmission axis direction of the reflective polarizing element 240 and the transmission axis direction of the absorptive polarizing element 600. FIG. 10 illustrates a case where the major axis of the first liquid crystal LC1 adjacent to the first alignment layer 162 and the major axis of the second liquid crystal LC2 adjacent to the second alignment layer 262 are twisted by about 90°, but the present disclosure is not limited thereto. In this case, the optical axis of the light transmitted through the liquid crystal layer 302 may be rotated along the major axis direction (director) of the liquid crystals LC1 and LC2 which are twisted in the thickness direction, thereby causing a phase delay. Hereinafter, an optical path and a polarization state of light transmitted through the reflective display device 1003 according to the present exemplary embodiment will be described in detail with reference to FIGS. 11 and 12.

Figure 11:
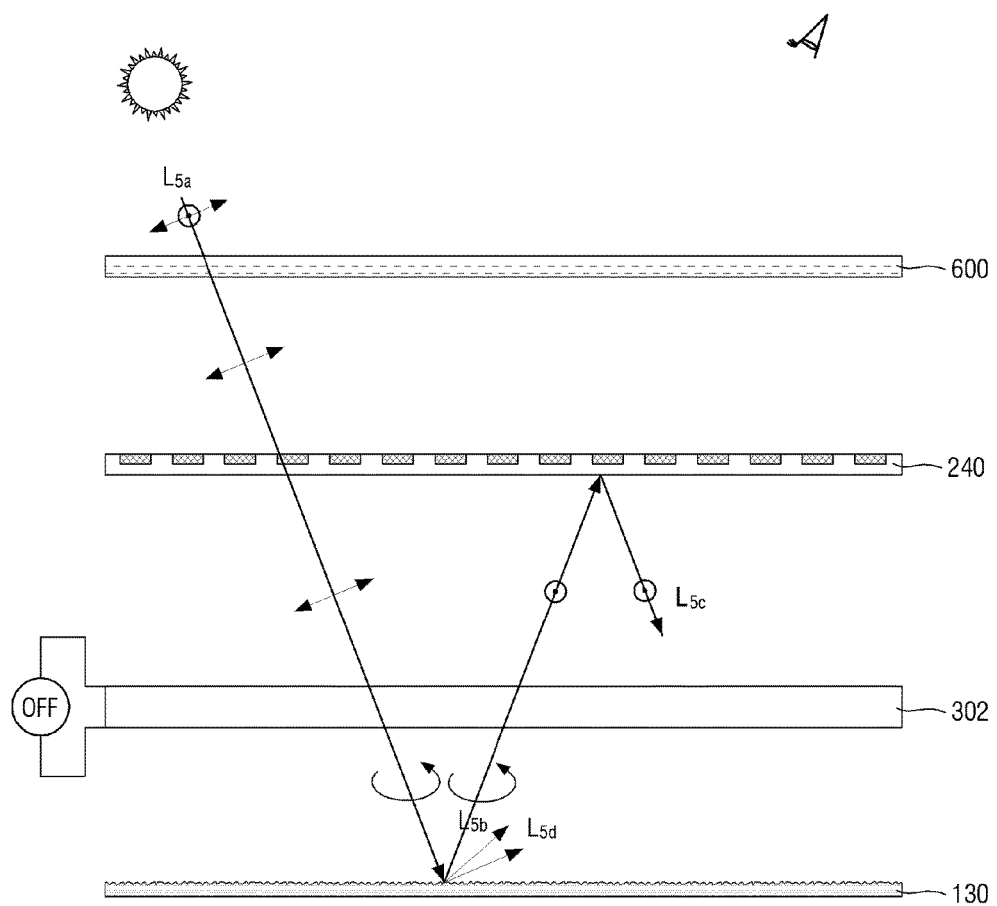
FIG. 11 is a schematic view showing an optical path when an electric field is not applied to the liquid crystal layer of the reflective display device of FIG. 10.
Figure 12:
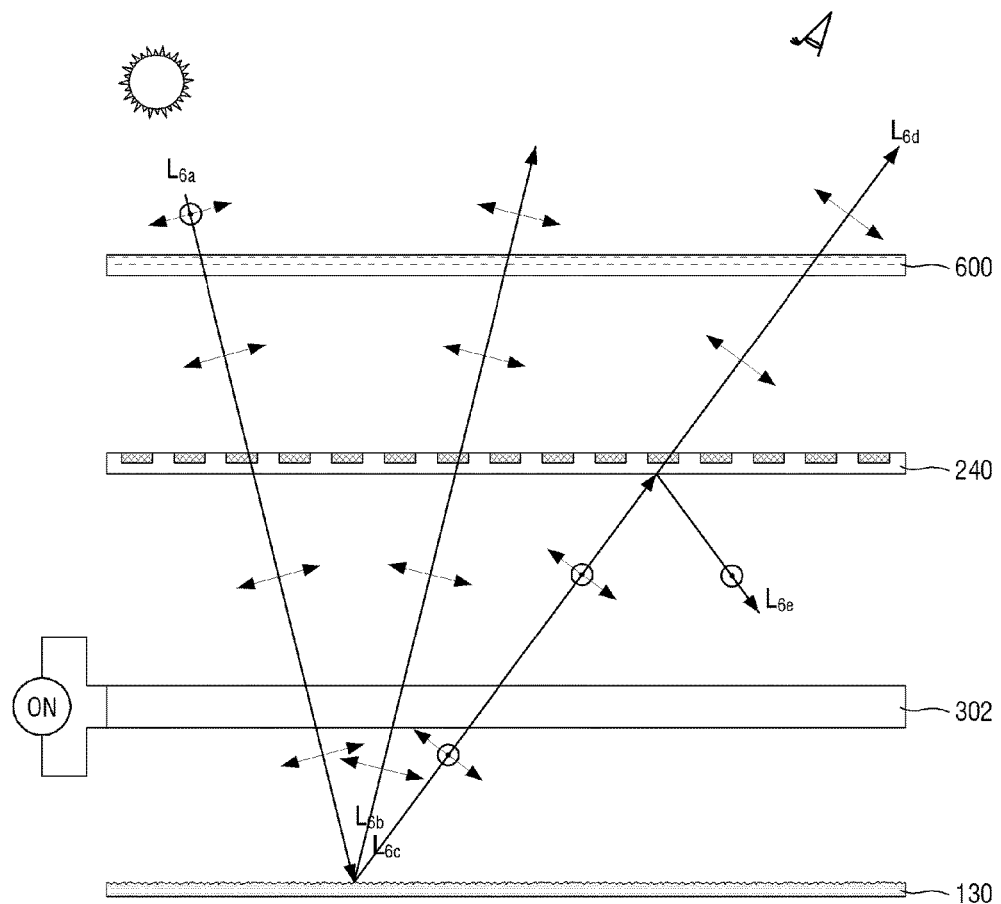
FIG. 12 is a schematic view showing an optical path when an electric field is applied to the liquid crystal layer of the reflective display device of FIG. 10.

FIG. 11 is a schematic view showing an optical path when an electric field is not applied to the liquid crystal layer of the reflective display device of FIG. 10. FIG. 12 is a schematic view showing an optical path when an electric field is applied to the liquid crystal layer of the reflective display device of FIG. 10.

First, referring to FIG. 11, external light $L_{5a}$ incident on the reflective display device from above the absorptive polarizing element 600 in a state where an electric field is not applied to the liquid crystal layer 302 may sequentially pass through the absorptive polarizing element 600, the reflective polarizing element 240 and the liquid crystal layer 302, and travel toward the reflection plate 130.

Specifically, the external light $L_{5a}$ incident on the absorptive polarizing element 600 may be in an unpolarized state. The external light $L_{5a}$ is polarized and separated by the absorptive polarizing element 600. The light transmitted through the absorptive polarizing element 600 and traveling toward the reflective polarizing element 240 may be light having a polarization component oscillating in the transmission axis direction (e.g., the first direction). On the other hand, light having a polarization component oscillating in the absorption axis direction (e.g., the second direction) may be absorbed by the absorptive polarizing element 600. The light having a polarization component oscillating in the first direction may pass through the reflective polarizing element 240 substantially as it is.

In a state where an electric field is not applied to the liquid crystal layer 302, the light passing through the liquid crystal layer 302 may be delayed in phase by $\lambda/4$. That is, the light linearly polarized in the first direction, which is transmitted through the reflective polarizing element 240 and travels toward the liquid crystal layer 302, may be circularly polarized while passing through the liquid crystal layer 302. The light transmitted through the liquid crystal layer 302 may be circularly polarized in a counter-clockwise direction, but the present disclosure is not limited thereto.

In an exemplary embodiment, in a state where an electric field is not applied to the liquid crystal layer 302, the polarization state of the light transmitted through the liquid crystal layer 302 and traveling toward the reflection plate 130 may have a phase delayed by $(2k+1)\lambda/4$ (where k is an integer equal to or greater than 0) as compared with the polarization state of the light transmitted through the absorptive polarizing element 600 and traveling toward the reflective polarizing element 240. FIG. 11 illustrates a case where a phase is delayed by $\lambda/4$ (k=0), but the present disclosure is not limited thereto.

At least a part of the light reflected by the reflection plate 130, for example, specularly reflected light $L_{5b}$, may travel toward the liquid crystal layer 302 again.

The light $L_{5b}$ specularly reflected by the reflection plate 130 may maintain the same polarization state as the light incident on the reflection plate 130. Further, in a state where an electric field is not applied to the liquid crystal layer 302, the light transmitted through the liquid crystal layer 302 may be delayed in phase by $\lambda/4$. That is, the light circularly polarized in a counter-clockwise direction, which is reflected by the reflection plate 130 and travels toward the liquid crystal layer 302, may be linearly polarized in the second direction while passing through the liquid crystal layer 302.

The light transmitted through the liquid crystal layer 302 and traveling toward the reflective polarizing element 240, i.e., the light having a polarization component oscillating in the second direction, may be reflected by the reflective polarizing element 240. Light $L_{5c}$ reflected by the reflective polarizing element 240 may travel toward the reflection plate 130 again. The reflected light $L_{5c}$ may be retro-reflected between the reflective polarizing element 240 and the reflection plate 130 and contribute to image display.

On the other hand, at least a part of the light reflected by the reflection plate 130, for example, diffusely reflected light $L_{5d}$ may be at least partly depolarized, and may be retro-reflected between the reflective polarizing element 240 and the reflection plate 130 and contribute to image display.

Then, referring to FIG. 12, external light $L_{6a}$ incident on the reflective display device from above the absorptive polarizing element 600 in a state where an electric field is applied to the liquid crystal layer 302 may sequentially pass through the absorptive polarizing element 600, the reflective polarizing element 240 and the liquid crystal layer 302 and travel toward the reflection plate 130.

Specifically, the external light $L_{6a}$ incident on the absorptive polarizing element 600 may be in an unpolarized state. The external light $L_{6a}$ may pass through the absorptive polarizing element 600 and the reflective polarizing element 240, as described with reference to FIG. 11.

In a state where an electric field is applied to the liquid crystal layer 301, the light passing through the liquid crystal layer 302 may not change its polarization state. That is, the light transmitted through the liquid crystal layer 302 and traveling toward the reflection plate 130 may be light linearly polarized in the first direction as it is.

In an exemplary embodiment, in a state where an electric field is applied to the liquid crystal layer 302, the polarization state of the light transmitted through the liquid crystal layer 302 and traveling toward the reflection plate 130 may have a phase delayed by 2k λ/2 (where k is an integer equal to or greater than 0) as compared with the polarization state of the light transmitted through the absorptive polarizing element 600 and traveling toward the reflective polarizing element 240. FIG. 12 illustrates a case where the phase is not delayed (k=0), i.e., the two lights have substantially the same polarization state, but the present disclosure is not limited thereto.

At least a part of the light reflected by the reflection plate 130, for example, specularly reflected light $L_{6b}$ may be sequentially transmitted through the liquid crystal layer 302, the reflective polarizing element 240 and the absorptive polarizing element 600, and then viewed by the viewer.

The light $L_{6b}$ specularly reflected by the reflection plate 130 may maintain the same polarization state as the light incident on the reflection plate 130. Further, in a state where an electric field is applied to the liquid crystal layer 302, the light transmitted through the liquid crystal layer 302 may not change its polarization state. That is, the light transmitted through the liquid crystal layer 302 and traveling toward the reflective polarizing element 240 may be light linearly polarized in the first direction as it is.

The light transmitted through the liquid crystal layer 302 and traveling toward the reflective polarizing element 240, i.e., the light having a polarization component oscillating in the first direction, may pass through the reflective polarizing element 240 and the absorptive polarizing element 600 as it is, and contribute to image display.

On the other hand, at least a part of the light reflected by the reflection plate 130, for example, diffusely reflected light $L_{6c}$ may be at least partially depolarized and have an unpolarized state. The unpolarized light may sequentially pass through the liquid crystal layer 302, and travel toward the reflective polarizing element 240. The light transmitted through the liquid crystal layer 302 and traveling toward the reflective polarizing element 240 is polarized and separated by the reflective polarizing element 240. Light $L_{6d}$ having a polarization component parallel to the transmission axis of the reflective polarizing element 240, for example, light $L_{6d}$ linearly polarized in the first direction, may pass through the reflective polarizing element 240 and the absorptive polarizing element 600 and contribute to image display. Light $L_{6e}$ having a polarization component parallel to the reflection axis of the reflective polarizing element 240, for example, light $L_{6e}$ linearly polarized in the second direction, may travel toward the reflection plate 130 again. The reflected light $L_{6e}$ may be retro-reflected between the reflective polarizing element 240 and the reflection plate 130 and contribute to image display.

The reflective display device according to the present exemplary embodiment is configured to delay a phase by (2k+1)λ/4 in the optical path from the external light source to the reflection plate 130 in a state where an electric field is not applied to the liquid crystal layer 302, and delay a phase by 2kλ/2 in the optical path from the external light source to the reflection plate 130 in a state where an electric field is applied to the liquid crystal layer 302. Accordingly, the amount of light lost can be minimized.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A reflective display device, comprising:
a reflection plate;
a liquid crystal layer disposed on the reflection plate, the liquid crystal layer further comprising a liquid crystal aligned vertically in an initial alignment state,
a first phase delay layer disposed on the liquid crystal layer;
a reflective polarizing element disposed on the first phase delay layer; and
an absorptive polarizing element disposed on the reflective polarizing element,
wherein the absorptive polarizing element admits external light that is in an unpolarized state.

2. The reflective display device of claim 1, wherein the reflection plate specularly reflects at least a part of light transmitted through the liquid crystal layer and incident on the reflection plate, and diffusely reflects at least a part of light transmitted through the liquid crystal layer and incident on the reflection plate.

3. The reflective display device of claim 2, wherein the liquid crystal layer further comprises an uneven surface, and one surface of the reflection plate faces the uneven surface.

4. The reflective display device of claim 2, wherein the reflection plate further comprises an opaque metal.

5. The reflective display device of claim 1, wherein a transmission axis of the reflective polarizing element is parallel to a transmission axis of the absorptive polarizing element.

6. The reflective display device of claim 5, wherein in a state where an electric field is applied to the liquid crystal layer, a Δnd value of the liquid crystal layer is (2k+1)λ/4, and k is an integer equal to or greater than 0.

7. The reflective display device of claim 6, wherein in a state where an electric field is not applied to the liquid crystal layer, the liquid crystal layer is configured to convert a polarization state of light transmitted through the liquid crystal layer and traveling toward the reflection plate to have a phase delayed by (2k+1)λ/4, as compared with a polarization state of light transmitted through the absorptive polarizing element and traveling toward the reflective polarizing element, and k is an integer equal to or greater than 0.

8. The reflective display device of claim 6, wherein a phase delay value of the first phase delay layer is (2k+1)λ/4, and k is an integer equal to or greater than 0.

9. The reflective display device of claim 8, further comprising a second phase delay layer disposed between the liquid crystal layer and the reflective polarizing element,
wherein a phase delay value of the second phase delay layer is (k+1)λ/2, and k is an integer equal to or greater than 0.

10. The reflective display device of claim 9, wherein in a state where an electric field is not applied to the liquid crystal layer, the liquid crystal layer is configured to convert a polarization state of light transmitted through the liquid crystal layer and traveling toward the reflection plate to have a phase delayed by (2k+3)λ/4, as compared with a polarization state of light transmitted through the absorptive polarizing element and traveling toward the reflective polarizing element, and k is an integer equal to or greater than 0.

11. The reflective display device of claim 6, further comprising a color conversion layer disposed between the liquid crystal layer and the first phase delay layer.

12. The reflective display device of claim 11, wherein the reflective polarizing element further comprises a first refraction layer and a second refraction layer, wherein the second refraction layer has a refractive index different from that of the first refraction layer, and wherein the first refraction layer and the second refraction layer are stacked alternately.

13. A reflective display device comprising:
a reflection plate;
a liquid crystal layer disposed on the reflection plate, wherein the liquid crystal layer further comprises a twisted nematic liquid crystal,
a reflective polarizing element disposed on the liquid crystal layer; and
an absorptive polarizing element disposed on the reflective polarizing element,
wherein the absorptive polarizing element admits external light that is in an unpolarized state.

14. The reflective display device of claim 13, wherein the reflection plate specularly reflects at least a part of light transmitted through the liquid crystal layer and incident on the reflection plate, and diffusely reflects at least a part of light transmitted through the liquid crystal layer and incident on the reflection plate.

15. The reflective display device of claim 13, wherein a transmission axis of the reflective polarizing element is parallel to a transmission axis of the absorptive polarizing element.

16. The reflective display device of claim 15, further comprising:
a first alignment layer disposed between the reflection plate and the liquid crystal layer; and
a second alignment layer disposed between the liquid crystal layer and the reflective polarizing element,
wherein in a state where an electric field is not applied to the liquid crystal layer, a major axis direction of the twisted nematic liquid crystal adjacent to the second alignment layer is parallel to a transmission axis direction of the reflective polarizing element.

17. The reflective display device of claim 16, wherein in a state where an electric field is not applied to the liquid crystal layer, a major axis direction of the twisted nematic liquid crystal adjacent to the first alignment layer intersects the transmission axis direction of the reflective polarizing element.

18. The reflective display device of claim 16, wherein in a state where an electric field is not applied to the liquid crystal layer, a $\Delta nd$ value of the twisted nematic liquid crystal layer is $(2k+1)\lambda/4$, and k is an integer equal to or greater than 0.

19. The reflective display device of claim 18, wherein in a state where an electric field is not applied to the liquid crystal layer, the liquid crystal layer is configured to convert a polarization state of light transmitted through the liquid crystal layer and traveling toward the reflection plate to have a phase delayed by $(2k+1)\lambda/4$, as compared with a polarization state of light transmitted through the absorptive polarizing element and traveling toward the reflective polarizing element, and k is an integer equal to or greater than 0.

20. The reflective display device of claim 18, wherein the reflective polarizing element further comprises a wire grid pattern.

* * * * *